R. G. COGHLAN.
AUTOMOBILE BODY.
APPLICATION FILED APR. 25, 1916.
1,277,294.
Patented Aug. 27, 1918.
3 SHEETS—SHEET 3.
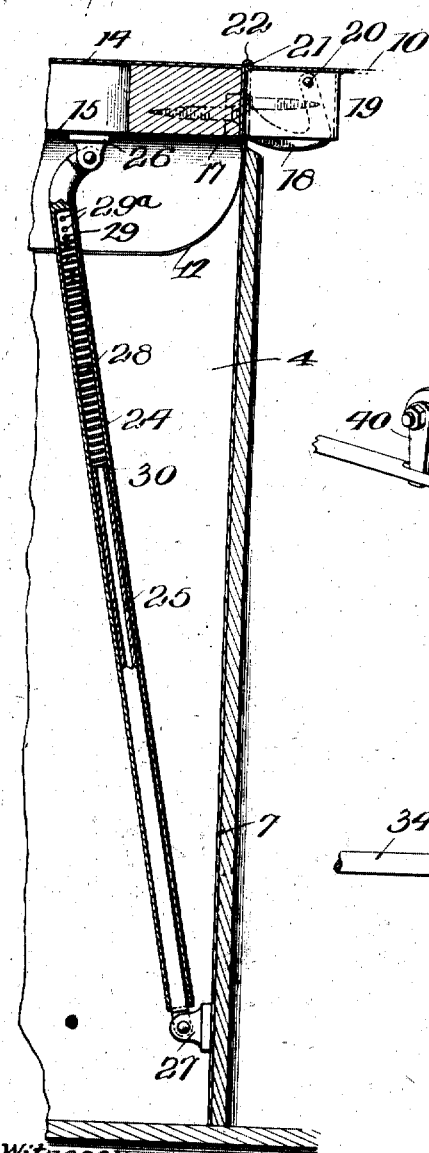
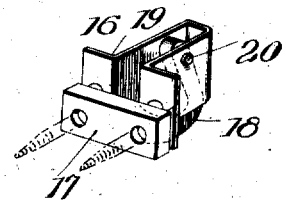
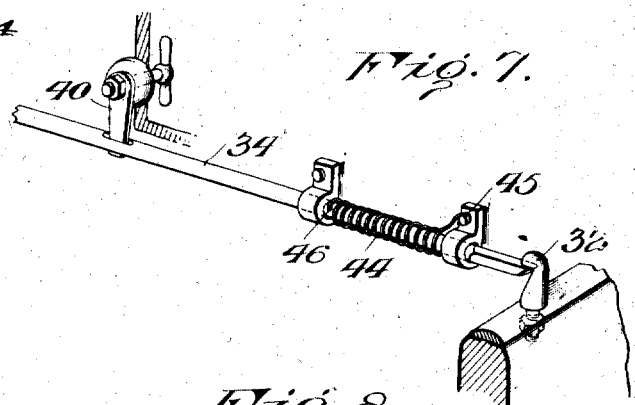
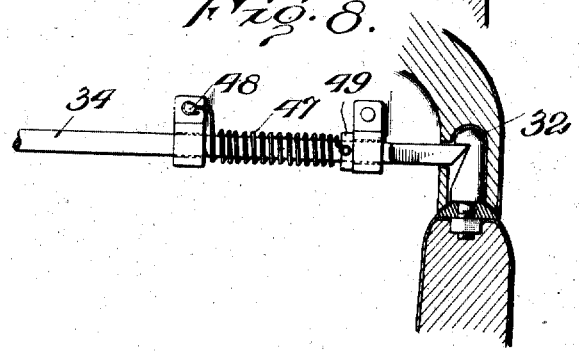
Inventor.
Raymond G. Coghlan.
by
Attorney.

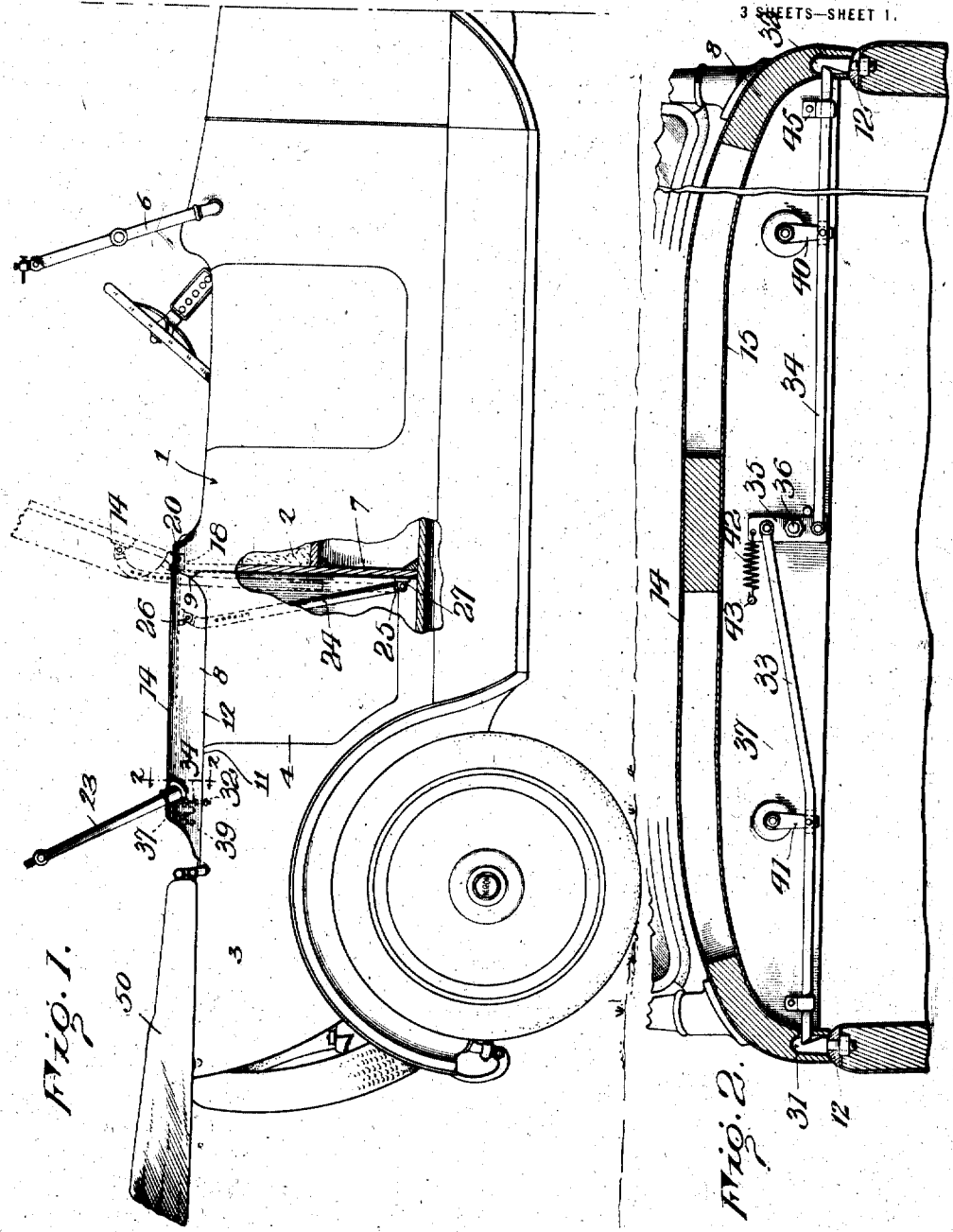

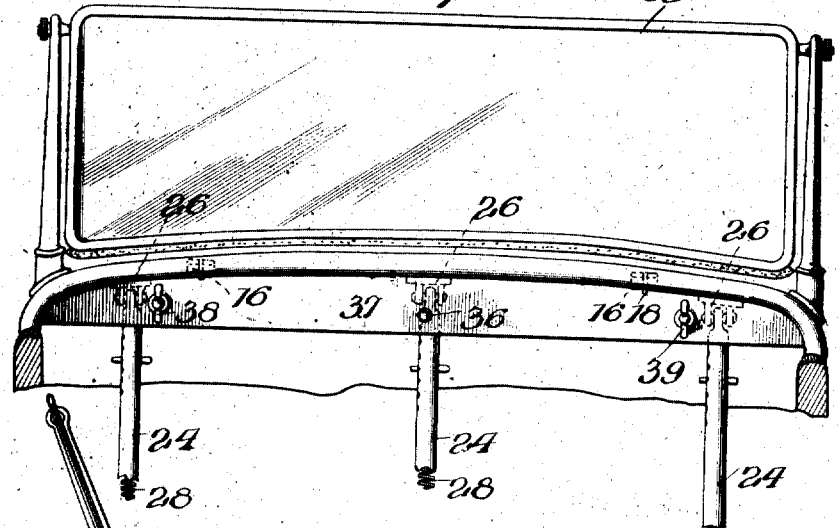
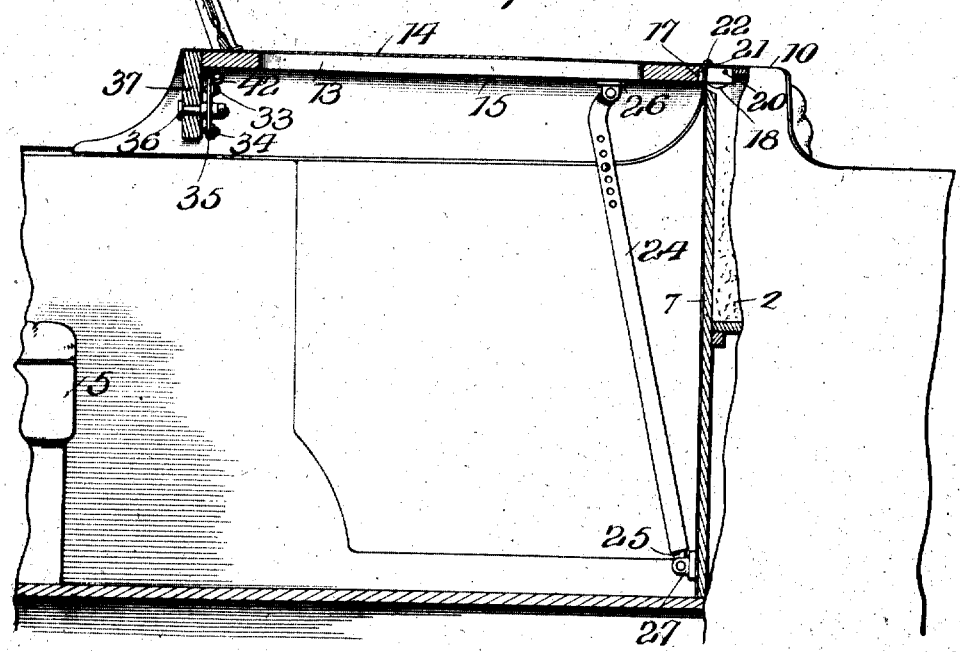

UNITED STATES PATENT OFFICE.

RAYMOND G. COGHLAN, OF NEWARK, NEW JERSEY.

AUTOMOBILE-BODY.

1,277,294.

Specification of Letters Patent.

Patented Aug. 27, 1918.

Application filed April 25, 1916. Serial No. 93,454.

*To all whom it may concern:*

Be it known that I, RAYMOND G. COGHLAN, a citizen of the United States, residing at Newark, in the county of Essex and State of New Jersey, have invented new and useful Improvements in Automobile-Bodies, of which the following is a specification.

The present invention relates to improvements in automobiles, and more particularly to the bodies thereof, and its primary object is to provide means for protecting the occupants of the rear seat or tonneau from dust, wind, and the weather, and for enhancing the appearance of the car.

With this object in view, the invention provides a rear cowl or deck which is so mounted on the body that it is adapted to provide a cover or closure for that portion of the rear compartment or tonneau between the back of the front seat and the seat of the rear compartment, the rear cowl or deck occupying this position when in use to protect the occupants of the rear seat or the tonneau, and the cowl being movable into a position where it will enable passengers to enter or leave the rear compartment or tonneau without inconvenience. Preferably, the rear cowl or deck carries a rear wind-shield which, when the cowl or deck is in operative position, is supported in front of the occupants of the rear seat. The rear cowl and wind-shield protect the occupants of the rear seat from wind and the weather from above and from the front, respectively, and when the top is raised, the cowl and wind-shield serve in conjunction therewith to inclose the occupants completely, or substantially so.

The present invention also provides means for automatically counterbalancing the weight of the rear cowl and wind-shield to facilitate the movements thereof to and from operative position, and, preferably, the counterbalancing means acts to automatically lift or move the cowl and wind-shield into an inoperative position and to retain these parts in such position until it is desired to return them to operative position. In conjunction with the counterbalancing means are provided catches for retaining the cowl and wind-shield in operative position, and these catches are releasable to control the movement of the cowl and wind-shield to an inoperative position.

The present invention provides novel catches which are capable of being easily and conveniently manipulated by an occupant of the seat at either side of the body.

To these and other ends, the invention consists in certain improvements, and combinations and arrangement of parts, all as will be hereinafter more fully described, the novel features being pointed out particularly in the claims at the end of the specification.

In the accompanying drawings:—

Figure 1 is a side elevation of a portion of an automobile, the body of which is equipped with a rear cowl, wind-shield and coöperative parts constructed in accordance with the preferred embodiment of the invention.

Fig. 2 represents a section on the line 2—2 of Fig. 1 and looking toward the rear, as indicated by the arrows.

Fig. 3 is a detail view showing the cowl and wind-shield as viewed from the rear thereof and looking forward.

Fig. 4 represents a longitudinal section through a portion of the body of the automobile, showing the operative position of the cowl and wind-shield.

Fig. 5 is a detail sectional view showing one of the counterbalancing devices for the cowl and wind-shield, and also illustrating one of the hinges for the cowl.

Fig. 6 is a detail perspective view of one of the hinges.

Fig. 7 is a detail perspective view showing one of the catches for retaining the cowl and wind-shield in operative position, this figure showing a modified form of spring for the catch; and Fig. 8 is a detail view of the catch showing a further modified form of spring therefor.

Similar parts are designated by the same reference characters in the several views.

The present invention is applicable generally to automobile bodies of the so-called "touring" type, or to the type having a rear compartment or tonneau containing a seat in rear of the front seat. Heretofore, it has been common to build such bodies with doors which close the sides thereof, but no provision has been made for inclosing the space between the sides and between the back of the front seat and the front of the rear seat, and hence the occupants of the rear seat are practically unprotected from dust and wind. The present invention provides means for protecting the occupants of the rear seat or tonneau from dust and wind, irrespective of whether a top is used or whether a top, if used, is raised or lowered, and the preferred construction is shown in the drawing and will be hereinafter described in detail. It is to be understood, however, that the invention is not restricted to the precise construction shown, as equivalent constructions within the scope of the claims are contemplated and will be included thereby.

In the present instance, 1 designates, generally, the body of an automobile, this body being of the so-called "touring" type embodying a front seat 2, a tonneau or rear compartment 3 having doors 4 in the sides thereof, and the tonneau or rear compartment having a rear seat 5 (Fig. 4). A windshield 6 which, preferably, slants rearwardly, as shown, is provided for the protection of those occupying the front seat, the front seat having a back 7 (Fig. 5) which divides it from the tonneau or rear compartment.

The present invention provides what I term a "rear cowl" 8 which may be of any desired form to fit the body to which it is applied and to harmonize with the contour thereof. In the present instance, this rear cowl is of a size and shape to fit closely against the rear edge 9 of the top 10 of the front seat and to fit closely upon the upper edges 11 and 12 of the sides and the doors, respectively of the tonneau. The rear cowl extends rearwardly from the top or back of the front seat to a point approximately above the front edge of the rear seat 5, thereby forming a closure or cover for that portion of the tonneau or rear compartment in front of the seat therein. The particular construction of this rear cowl may be varied as desired. As shown, it comprises a frame 13 (Fig. 4) having an exterior sheet metal covering or sheathing 14, and it may also be provided, if desired, with an interior lining of sheet metal or other material 15 (Fig. 2). In the present embodiment of the invention, the rear cowl is hinged at its forward edge to the back of the front seat whereby this cowl may be swung to and from operative position, thus enabling passengers to enter and leave the tonneau without inconvenience. As shown, a pair of hinges 16 is provided for this purpose, these hinges being preferably of the concealed type, one hinge member 17 being screwed or otherwise fastened to the front edge of the rear cowl and having a bent knuckle 18 which operates within the hinge member 19, the latter being mortised or set into the back of the front seat on a level below the top 10 thereof. The hinge members are connected by the pivot 20. A dust and weather-tight joint is preferably provided between the forward edge of the rear cowl and the back of the front seat when the rear cowl is in its lower or operative position. This weather-tight joint in the construction shown is formed by a bead 21 (Fig. 5) formed along the rear edge of the top 10 of the front seat and a flange 22 carried by the rear cowl and overhanging the front edge thereof, this flange coming down upon the bead as the cowl is lowered to its operative position and thereby providing a weather-tight joint. The bent form of the knuckles 18 of the hinges enables the rear cowl to be swung upwardly to its inoperative position, as shown by the dotted lines in Fig. 1.

A rear cowl of this character protects the portion of the rear compartment or tonneau in front of the seat therein from above, and it is preferable to also protect the occupants of the rear seat from dust, wind or the weather entering from the front. To accomplish this result, a wind-shield 23 of any suitable type is provided, and this windshield is preferably located at or in proximity to the rear edge of the cowl, and is preferably carried by the cowl so that it will be moved to and from operative position during the corresponding movements of the cowl. Preferably, this rear wind-shield slants rearwardly at an angle corresponding with the rearward slant of the front windshield.

The present invention provides means to compensate for the unbalanced weight of the rear cowl and wind-shield in order to facilitate the movements of these parts to and from operative position. In the preferred construction, as shown, the counterbalancing means also constitutes means which will act automatically to lift or swing the rear cowl and wind-shield to an inoperative position when such parts are released, and to maintain said cowl and wind-shield in such position. Such a construction is particularly desirable, in that it only requires release of the holding means to cause the rear cowl and wind-shield to move into an inoperative position and thus enable the passengers to enter or leave the tonneau, and the rear cowl and wind-shield may be returned to operative position by merely pulling the same down until said cowl is again engaged by its holding means. As shown, the counterbalancing or automatic lifting devices for the rear cowl and wind-shield comprise a suitable number of telescopic members 24 and 25 (Fig. 5), each member 24 being pivotally connected at its upper end to a bracket 26 fixed to the under side of the rear cowl, and each of the members 25 being pivotally connected at its lower end to a bracket 27 fixed to the rear wall 7 of the front seat. A coiled compression spring 28 is contained within the tubular member 24, one end of the spring abutting against a pin 29 which may be set in any one of the longitudinally spaced openings 29ᵃ in this member whereby the strength of the spring may be adjusted, while the opposite end of the spring abuts against the end 30 of the member 25. The expansive tendency of each spring 28 acts to push the rear cowl upwardly or into its dotted line position as shown in Fig. 1 and, preferably, the power of the springs is sufficient to enable them to overbalance the weight of the rear cowl and wind-shield, whereby they will automatically lift or swing the rear cowl and wind-shield upwardly into the position specified when there is no restraint to such movement, and maintain them by their pressure in such position. These telescopic counterbalancing or lifting devices for the rear cowl preferably are so positioned that when the rear cowl and wind-shield are swung into the upper or inoperative position, as shown by the dotted lines in Fig. 1, said telescopic members will come against or into close proximity to the back 7 of the front seat, thereby avoiding obstruction to the passengers in entering and leaving the tonneau, and these telescopic members may also serve to limit the movement of the rear cowl and wind-shield as these parts assume an inoperative position.

The present invention provides means for normally retaining the rear cowl in its lower or operative position and where, as in the present embodiment of the invention, the counterbalancing devices operate automatically to lift the rear cowl and wind-shield, the retaining means also serve to control the operation of these automatic lifting devices. In the present construction, a pair of dogs 31 and 32 (Figs. 2, 7 and 8) is provided, these dogs being secured on the tops of the respective sides of the tonneau or rear compartment. The rear cowl is provided at its sides with notches or recesses to receive these dogs when the cowl is in its lower or operative position, and the rear cowl also carries a pair of locking members 33 and 34 which are movable longitudinally so as to engage and disengage relatively to the dogs 31 and 32, respectively. The ends of the locking members are preferably beveled, as shown, whereby they will have a latching engagement with the dogs as the rear cowl is lowered or brought into its operative position. To facilitate manipulation of the locking members, they are connected at their inner ends to a member 35 (Fig. 2) which is pivoted on an axis 36, which axis is between the points at which the members 33 and 34 are connected to the member 35, whereby rotation of the member 35 about its axis will cause simultaneous retraction of the locking members relatively to the dogs 31 and 32. To accommodate the catches, the rear cowl is preferably provided with a board 37 (Fig. 4), the locking members 33 and 34, and also the member 35, being arranged at the forward side of this board, and the pivot 36 being supported by this board. The catches are thereby substantially concealed from view. Suitable means is provided at the rear of the board 37 for retracting the locking members when it is desired to move the rear cowl and wind-shield to an inoperative position. Preferably, means is provided whereby the occupant of the rear seat may unlock the rear cowl to permit raising thereof, whether the occupant is sitting at the left or the right side of the body, and the releasing means is also so arranged that it may be readily manipulated by a person standing at either side of and at the exterior of the body. As shown, the releasing means embodies a pair of handles 38 and 39 (Fig. 3), the operative portions of which are exposed at the rear of the board 37 and at points near the respective sides of the body. These handles have shafts which extend rotatably through the board 37 and have cranks 40 and 41, respectively, fixed thereon, the crank 40 being operatively connected to the locking member 34, while the crank 41 is operatively connected to the member 33. Rotation of either handle in the appropriate direction will operate to simultaneously retract both locking members, the pivoted member 35 connecting the locking members and causing them to operate in unison. Means is provided for normally retaining the locking members in engagement with the retaining dogs. As shown in Fig. 2, a single tension spring 42 serves this purpose, it being attached at one end to one end of the member 35, while its opposite end is attached at a point 43 to the board 37, the tension of this spring applying a force to the member 35 in a direction which will cause the locking members to engage the retaining dogs and to remain in engagement therewith. However, if desired, constructions such as shown in Figs. 7 and 8 may be used. In Fig. 7, a coiled tension spring 44 encircles the locking member, one end of the spring being fastened, as at 45, to a part stationary with the board 37, while the opposite end of the spring is attached, as at 46, to the locking member. In using his construction, it is preferable to provide such a spring for each locking member, and the spring in each instance will operate to cause its respective locking member to engage and to remain in engagement with its respective retaining dog. In the construction shown in Fig. 8, a coiled compression spring 47 encircles the locking member, the expansive tendency of this spring being sustained at one end, as at 48, and at the opposite end, by a collar 49 fixed to the locking member. In using a compression spring of this type, it is preferable to provide such a spring for each locking member, the springs acting to engage the respective locking members with their retaining dogs and to maintain them in such engagement.

In using catches of any of the types hereinbefore described, or their equivalent, the rear cowl and wind-shield will be held in their lower or operative position, and the lifting devices will be restrained from operation. However, in order to bring the rear cowl and wind-shield to an inoperative position and thus enable passengers to enter or leave the tonneau conveniently, it is only necessary to manipulate one of the handles, whereby both catches are released, and the rear cowl and wind-shield will then rise to a position where they will not obstruct entrance or exit of the passengers. To return the rear cowl and wind-shield to operative position, it is only necessary to pull the same downwardly until the cowl comes into engagement with the tops of the sides and the doors of the tonneau, the catches at that moment acting automatically to latch the cowl down in its operative position.

The body of the automobile may be equipped with a top of any desired type, the top 50 being shown in the present instance as folded down. It will be understood, however, that the cowl and wind-shield provided by the present invention will protect the occupants of the rear compartment or tonneau whether the usual full length top is employed or whether a top of the so-called "Victoria" type is used, and also where no top is used.

The space at the front of the tonneau or rear compartment and beneath the rear cowl is so inclosed by the rear cowl as to provide a convenient place for lockers, a clock and other accessories.

I claim as my invention:—

1. In an automobile body having a rear compartment or tonneau, a rear cowl adapted in its operative position to cover the forward portion of such compartment and movable into an inoperative position, catches for retaining the cowl in operative position, and a plurality of releasing devices for the catches located at opposite sides of the center of the body.

2. In an automobile body having a rear compartment or tonneau, a rear cowl adapted in its operative position to cover the forward portion of such compartment and movable into an inoperative position, catches for retaining the cowl in operative position, and a plurality of releasing devices for the catches located at opposite sides of the center of the body and accessible from the rear of the cowl.

3. In an automobile body having a rear compartment or tonneau, a rear cowl adapted in its operative position to cover the forward portion of such compartment and movable into an inoperative position, and catches for retaining the cowl in operative position embodying dogs fixed to the respective sides of the compartment, locking members carried by the cowl and adapted to coöperate with the respective dogs, and means for effecting simultaneous retraction of said members relatively to said dogs.

4. In an automobile body having a rear compartment or tonneau, a rear cowl adapted in its operative position to cover the forward position of such compartment and movable into an inoperative position, and catches for retaining the cowl in operative position embodying dogs fixed to the respective sides of the compartment, locking members carried by the cowl and adapted to coöperate with the respective dogs, means connecting said members to effect simultaneous movement thereof, and a pair of handles located at opposite sides of the center of the body coöperative with the respective locking members, whereby manipulation of either handle will retract both locking members.

5. In an automobile body equipped with a rear compartment or tonneau having a seat therein and doors in its opposite sides, a rigid rear deck or cowl normally disposed in a substantially horizontal position, in which it extends over the forward portion of said compartment from side to side thereof, with its sides directly resting upon and engaged with the top edges of said doors and of the immediately-adjacent portions of the tonneau sides, thereby covering said forward portion and preventing entrance and exit to and from the same through said doors; said cowl being movable bodily away from such position to an inoperative position in which said doors can be opened to permit such entrance and exit.

6. In an automobile body equipped with a rear compartment or tonneau having a seat therein and doors in its opposite sides, a rigid rear deck or cowl normally disposed in a substantially horizontal position in which it extends over the forward portion of said compartment from side to side thereof, with its sides directly resting upon and engaged with the top edges of said doors and of the immediately-adjacent portions of the tonneau sides, thereby covering said forward portion and preventing entrance and exit to and from the same through said doors; said cowl being movable bodily away from such position to an inoperative position in which said doors can be opened to permit such entrance and exit; and catches for positively holding said cowl in its first-named or operative position, comprising co-acting parts carried by the cowl and the tonneau sides.

In testimony whereof I have hereunto set my hand in presence of two subscribing witnesses.

RAYMOND G. COGHLAN.

Witnesses:
WM. J. COGHLAN,
SYLVIA C. BUSCH.